(12) United States Patent
Brake et al.

(10) Patent No.: US 11,544,605 B2
(45) Date of Patent: Jan. 3, 2023

(54) UNIT CONVERSION IN A SYNONYM-SENSITIVE FRAMEWORK FOR QUESTION ANSWERING

(71) Applicant: INTERNATIONAL BUSINESS MACHINES CORPORATION, Armonk, NY (US)

(72) Inventors: Kyle M. Brake, Dublin, OH (US); Stephen A. Boxwell, Franklin, OH (US); Keith G. Frost, Delaware, OH (US); Stanley J. Vernier, Grove City, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1068 days.

(21) Appl. No.: 15/914,482

(22) Filed: Mar. 7, 2018

(65) Prior Publication Data

US 2019/0279104 A1    Sep. 12, 2019

(51) Int. Cl.
*G06N 7/00* (2006.01)
*G06N 5/02* (2006.01)
*G06F 40/30* (2020.01)

(52) U.S. Cl.
CPC ............ *G06N 7/005* (2013.01); *G06F 40/30* (2020.01); *G06N 5/02* (2013.01)

(58) Field of Classification Search
CPC combination set(s) only.
See application file for complete search history.

(56) References Cited

U.S. PATENT DOCUMENTS

| 8,745,019 | B2 | 6/2014 | Cheng et al. |
| 9,183,297 | B1 | 11/2015 | Baker et al. |
| 9,245,015 | B2 | 1/2016 | Misra et al. |
| 9,613,025 | B2 | 4/2017 | Heo et al. |
| 9,639,602 | B2 | 5/2017 | Ben Shahar et al. |
| 2014/0122527 | A1 | 5/2014 | Ichimura |
| 2014/0272909 | A1* | 9/2014 | Isensee .................. G09B 7/02 434/362 |

(Continued)

OTHER PUBLICATIONS

"Xu et al., Answer Selection and Confidence Estimation, 2003, AAAI Technical Report SS-03-07" (Year: 2003).*

(Continued)

*Primary Examiner* — Ann J Lo
*Assistant Examiner* — Fen Christopher Tamulonis
(74) *Attorney, Agent, or Firm* — Conley Rose, P.C.

(57) ABSTRACT

A question and answer (QA) system, computer program product, and computer-implemented method configured to determine an answer to a question that includes a measurement value. In one example, the QA system receives a question and analyzes the question to identify a measurement value specified in the question. The QA system determines relevant passages to the question. The QA system assigns a measurement value confidence score to a relevant passage based on a comparison of the measurement value specified in the question and a second measurement value specified in the relevant passage. The QA system determines an order of the relevant passages using the measurement value confidence score of each of the relevant passages. The QA system determines an answer to the question based on the order of the relevant passages.

17 Claims, 4 Drawing Sheets

(56) References Cited

U.S. PATENT DOCUMENTS

| | | |
|---|---|---|
| 2015/0379081 A1 | 12/2015 | Lester et al. |
| 2016/0004766 A1 | 1/2016 | Danielyan et al. |
| 2016/0147210 A1* | 5/2016 | Hogan ............... G05B 19/0423 704/3 |
| 2017/0242915 A1 | 8/2017 | Torisawa et al. |

OTHER PUBLICATIONS

"Reinaldha et al, Natural language interfaces to database (NLIDB): Question handling and unit conversion, 2014, International Conference on Data and Software Engineering, pp. 1-6" (Year: 2014).*

"Nekola et al., The distance decay of similarity in biogeography and ecology, 1999, Journal of Biogeography, vol. 26, p. 867-878" (Year: 1999).*

"Banerjee, Android Stackexchange: Google-Maps localization thread, 2015, https://android.stackexchange.com/questions/16277/how-can-i-get-google-maps-on-android-to-show-metric-units" (Year: 2015).*

Steven O'Hara and Tom Bylander. 2011. Numeric Query Answering on the Web. Int. J. Semant. Web Inf. Syst. 7, 1 (Jan. 2011), 1-17. DOI:https://doi.org/10.4018/jswis.2011010101 (Year: 2011).*

Viet Ha-Thuc et al. 2016. Search by Ideal Candidates: Next Generation of Talent Search at LinkedIn. WWW'16 Companion international World Wide Web Conferences Steering Committee, Republic and Canton of Geneva, CHE, 195-198. DOI:https://doi.org/10.1145/2872518.2890549 (Year: 2016).*

W3C "SPARQL Query Language for RDF" W3C [Published 2008] [Retrieved Dec. 2021] <URL: https://www.w3.org/TR/rdf-sparql-query/> (Year: 2008).*

MasterClass staff "Syntax vs. Semantics: Differences Between Syntax and Semantics" MasterClass [Published Jul. 2021][Retrieved Jan. 2022]<URL: https://www.masterclass.com/articles/syntax-vs-semantics#examples-of-syntax-in-writing> (Year: 2021).*

Diptikalyan, S. et al., "Natural language querying in SAP-ERP platform," Proceedings of the 2017 11th Joint Meeting on Foundations of Software Engineering. ACM, 2017, pp. 878-883.

Minaee, et al., "Automatic Question-Answering Using a Deep Similarity Neural Network," arXiv preprint arXiv:1708.01713, 2017, 5 pages.

* cited by examiner

UNIT CONVERSION IN A SYNONYM-SENSITIVE FRAMEWORK FOR QUESTION ANSWERING

BACKGROUND

The present disclosure relates generally to Question and Answer (QA) systems. QA systems take an input question, analyze it, search and analyze a corpus of data, and return results indicative of the most probable answer to the input question. A QA system may include natural language processing (NLP), which is the ability of a computer program to understand human speech as it is spoken. One such QA system is the IBM Watson™ system available from International Business Machines (IBM) Corporation of Armonk, N.Y.

SUMMARY

The present disclosure includes various embodiments including a QA system, a computer-implemented method, and a computer program product for determining an answer to a question that includes a measurement value. The disclosed embodiments seek to improve a QA system by applying synonyms for units of measurements and their values in questions received by the QA system in determining the most probable answer(s) to the question.

As an example, the disclosed embodiments include a computer-implemented method performed by a QA system for determining an answer to a question that includes a measurement value. The computer-implemented method includes the step of receiving a question by the QA system. The computer-implemented method performs a question analysis that includes analyzing the question for a measurement value. The computer-implemented method determines relevant passages in a corpus of work based on the question analysis. The computer-implemented method assigns a measurement value confidence score to each of the relevant passages based on a comparison of the measurement value specified in the question and a second measurement value specified in the relevant passage. The computer-implemented method determines an order of the relevant passages using the measurement value confidence score of each of the relevant passages. The computer-implemented method determines an answer to the question based on the order of the relevant passages. The computer-implemented method provides the answer to a user.

The disclosed embodiments also include a QA system configured to determine an answer to a question that includes a measurement value. In one embodiment, the system includes memory that stores instructions, and a processor configured to execute the instructions to receive a question and perform a question analysis that includes analyzing the question for a measurement value. The processor further executes instructions to determine relevant passages to the question based on the question analysis. The processor further executes instructions to assign a measurement value confidence score to each of the relevant passages based on a comparison of the measurement value specified in the question and a second measurement value specified in the relevant passage. The processor executes instructions to determine an order of the relevant passages using the measurement value confidence score of each of the relevant passages. The processor executes instructions to determine an answer to the question based on the order of the relevant passages. The processor executes instructions to provide the answer to a user.

Another disclosed embodiment is a computer program product comprising a computer readable storage medium having program instructions embodied therewith, the program instructions executable by a processor. Executing the program instructions causes the processor to receive a question and perform a question analysis that includes analyzing the question for a measurement value; determine relevant passages to the question based on the question analysis; assign a measurement value confidence score to each of the relevant passages based on a comparison of the measurement value specified in the question and a second measurement value specified in the relevant passage; determine an order of the relevant passages using the measurement value confidence score of each of the relevant passages; determine an answer to the question based on the order of the relevant passages; and provide the answer to a user.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
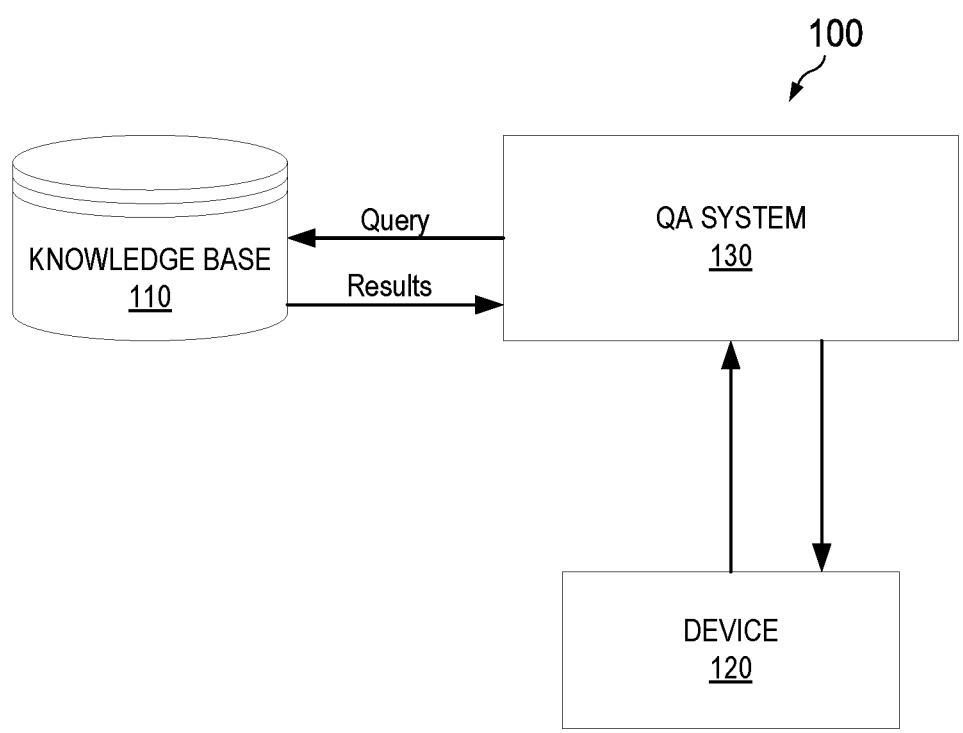
FIG. 1 is a high-level system block diagram according to an embodiment of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

As referenced herein, the term database or knowledge base is defined as collection of structured or unstructured data. Although referred in the singular form, the database may include one or more databases, and may be locally stored on a system or may be operatively coupled to a system via a local or remote network.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a unit may also refer to a particular set of functions, software instructions, or circuitry that is configured to perform a specific task.

Also, as used herein, the term "communicatively coupled" means capable of sending and/or data over a communication link. The communication link may include both wired and wireless links, and may be a direct link or may comprise of multiple links passing through one or more communication network devices such as, but not limited to, routers, firewalls, servers, and switches. The network device may be located on various types of networks such as local-area networks (LANs), wide-area networks (WANs), and metropolitan-area networks (MANs). The networks may include private networks and/or public networks such as the Internet. Additionally, in certain embodiments, communication links may also encompass internal communication between various components of a system and/or with an external input/output device such as a keyboard or display device.

FIG. 1 is a high-level system block diagram 100 according to an embodiment of the present disclosure. The system block diagram 100 includes a QA system 130, a knowledge base 110, and a device 120. The QA system 130 includes and/or is communicatively coupled to the knowledge base 110. The knowledge base 110 contains a collection or corpus of data, documents, or other works, which may include structured and unstructured data. In one embodiment, the knowledge base 110 is a graph database that stores a knowledge graph that describes the data in the knowledge base based on their relations. The knowledge graph may be generated from an existing knowledge graph such as, but not limited to, Yago™ and/or Freebase™. Alternatively, the knowledge graph may be generated by administrators without the use of a prior knowledge graph.

The QA system 130 is also communicatively coupled to the device 120. In some embodiments, only a designated or authorized device 120 may be capable of interacting with the QA system 130. The device 120 may be an end user device or may be another system that that is configured to utilize the QA system 130. Non-limiting examples of device 120 include a personal computer (desktop or laptop), mobile devices (e.g., personal digital assistant (PDA), smart phone, tablet), and network servers.

The QA system 130 is configured to execute instructions for processing an input question received from the device 120 and generate one or more answers for the input question using the information contained in the knowledge base 110. In one embodiment, the QA system 130 parses the question to identify components of the question (e.g., subject, predicate, and object), uses the identified components to formulate queries, and then applies those queries to the corpus of data contained in the knowledge base 110. Based on the application of the queries to the corpus of data, the QA system 130 generates candidate answers to the input question. The QA system 130 may utilize various scoring algorithms in generating the candidate answers. For example, a scoring algorithm may look at the matching of terms and synonyms within the language of the input question and the found portions of the corpus of data. Other scoring algorithms may look at temporal or spatial features in the language, while others may evaluate the source of the portion of the corpus of data and evaluate its reliability.

Scores may be obtained from the various scoring algorithms to indicate the extent to which the potential response is inferred by the input question based on the specific area of focus of that scoring algorithm. In an embodiment, each resulting score may be weighed against a statistical model. The statistical model captures how well the scoring algorithm performed at establishing the inference between two similar passages for a particular domain during the training period of the QA system 130. The statistical model may then be used to summarize a level of confidence that the QA system 130 has regarding the evidence that the potential response, i.e. candidate answer, is inferred by the question. This process may be repeated for each of the candidate answers until the QA system 130 identifies candidate answers that surface as being significantly stronger than others and thus, generates a final answer, or ranked set of answers, for the input question.

The disclosed embodiments seek to improve upon the above process as it relates to questions that include a measurement unit or value. For example, the QA system 130 may receive the question "How many basketball players are 7 feet tall?" The question includes the measurement value 7 feet. Current QA systems are configured to query the knowledge base 110 for information related to basketball players that are "7 feet" in height. However, the knowledge base 110 may also include information regarding the height of basketball players that are not specified in "feet" measurement units. For example, international basketball players may have their height specified in meters. Other articles may specify a basketball player's height in inches. Thus, current QA systems may not be able to provide a complete and accurate answer to the question. Accordingly, the disclosed embodiments seek to improve upon current QA systems by providing a unit conversion in a synonym-sensitive framework for answering questions that include a measurement unit or value.

Figure 2:
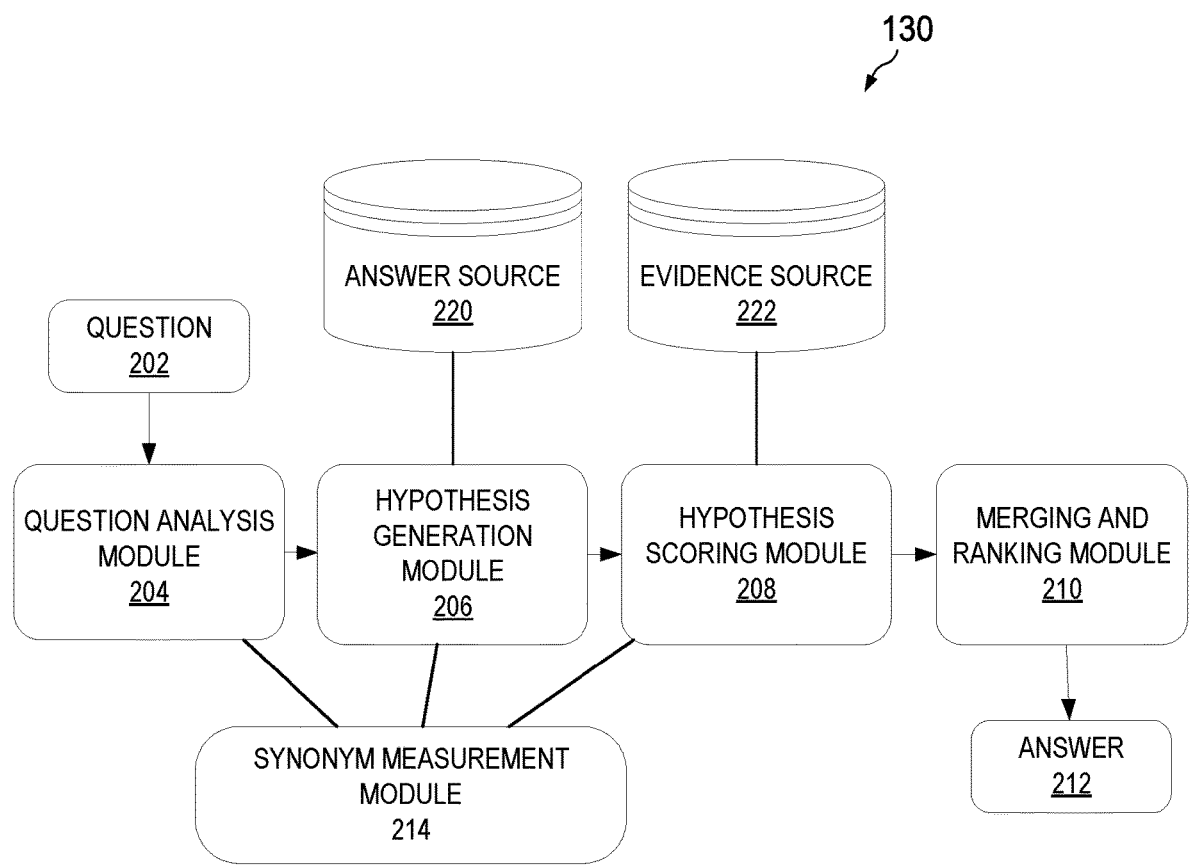
FIG. 2 is a block diagram illustrating a high-level software architecture of a QA system according to an embodiment of the present disclosure.

FIG. 2 illustrates an example of a high-level software architecture of the QA system 130 according to an embodiment of the present disclosure. As shown in FIG. 2, the QA system 130 includes a question analysis module 204, a hypothesis generation module 206, a hypothesis scoring module 208, and a merging and ranking module 210. In one embodiment, the question analysis module 204 is configured to analyze a question 202. The question analysis module 204 includes algorithms that attempt to understand the question 202 being asked and performs the initial analyses that determine how the question 202 will be processed by the rest of the QA system 130. Broadly speaking, the question analysis module 204 receives as input the question 202 as unstructured text and attempts to identify the syntactic and semantic elements of the question 202. The question analysis module 204 encodes the elements of the syntactic and semantic elements of the question 202 as structured information that is later used by the other components of the QA system 130. The question analysis module 204 may also include instructions for performing natural language processing (NLP), decomposition, shallow parses, deep parses, logical forms, semantic role labels, coreference, relations (e.g., subject-verb-object predicates or semantic relationships between entities), named entities, etc., as well as specific kinds of analysis for question classification. NLP enables the QA system 130 to understand human speech. Question classification is the task of identifying question types or parts of questions that require special processing. This may include anything from single words with potentially double meanings to entire clauses that have certain syntactic, semantic, or rhetorical functionality that may inform downstream components with their analysis. In some embodiments, question classification may classify a question as a puzzle question, a math question, a definition question, and so on. Additionally, question classification may identify puns, constraints, definition components, or entire subclues within questions.

Once the question has been analyzed, the hypothesis generation module 206 includes instructions that take the results of the question analysis and produces candidate answers by searching the system's sources such as knowledge base 110 and extracting answer-sized snippets from the search results. In an embodiment, a variety of search techniques may be used including the use of multiple text search engines with different underlying approaches, document search as well as passage search, knowledge base search using SPARQL on triple stores, the generation of multiple search queries for a single question, and backfilling hit lists to satisfy key constraints identified in the question. Triple store queries are based on named entities in the clue; for example, find all database entities related to the clue entities. In an embodiment, the goal of the hypothesis generation module 206 is to find as much potentially answer-bearing content (i.e., candidate answers) as possible based on the results of question analysis.

Each candidate answer or hypothesis is then passed to a hypothesis scoring module 208. The hypothesis scoring module 208 includes instructions that apply a wide variety of deep scoring analytics to evaluate each candidate answer. In one embodiment, the hypothesis scoring module 208 includes instructions to gather additional supporting evidence. For example, in one embodiment, a passage search that includes the candidate answer as a required term is added to the primary search query derived from the question. This will retrieve passages that contain the candidate answer used in the context of the original question terms. Supporting evidence may also come from other sources like triple stores. The hypothesis scoring module 208 is configured to evaluate the candidate answer in the context of the supporting evidence. Additionally, in an embodiment, the hypothesis scoring module 208 includes various scoring algorithms that consider different dimensions of the evidence and produce a score that corresponds to how well evidence supports a candidate answer for a given question. For example, Watson® employs more than 50 scoring components that produce scores ranging from formal probabilities to counts to categorical features, based on evidence from different types of sources including unstructured text, semistructured text, and triple stores. These scorers consider various factors including, but not limited to, the degree of match between a passage's predicate-argument structure and the question, passage source reliability, geospatial location, temporal relationships, taxonomic classification, the lexical and semantic relations the candidate is known to participate in, the candidate's correlation with question terms, its popularity (or obscurity), and its aliases.

After each of the candidate answers are scored by the various scoring algorithms, a merging and ranking module 210 evaluates the various hypotheses by merging all of the various scores of each candidate answer. After merging, the merging and ranking module 210 ranks the hypotheses to identify the single best-supported hypothesis given the evidence to produce an answer 212. In one embodiment, the merging and ranking module 210 may be configured to provide an estimate of its confidence that the answer is correct.

As stated above, the disclosed embodiments include a unit conversion in a synonym-sensitive framework for answering questions that include a measurement value. In one embodiment, a synonym measurement module 214 may be incorporated within the QA system 130 to identify questions that include a measurement value. The synonym measurement module 214 may include instructions for converting a measurement unit or value found in question or a passage to a default measurement unit to enable comparison of the values. The default measurement unit may be the measurement unit specified in the question or may be a predetermined or user-specified measurement unit. In one embodiment, the hypothesis scoring module 208 may utilize the synonym measurement module 214 to compare the values found in passages to the value and provide a score reflecting the distance between the values after conversion to the same units. This enables the QA system 130 to process the fuzzy measurement values alongside other grammatical evidence, rather than as an ad-hoc add-on.

As an example, assume the question analysis module 204 receives the question "Which President of the United States was 335 pounds?" The synonym measurement module 214 converts the measurement value of 335 pounds to a default measurement unit and its corresponding value. The hypothesis generation module 206 produces passages/candidate answers that include by searching the system's available knowledge sources. The hypothesis scoring module 208 scores the passages using the synonym measurement module 214 to compare the values found in passages to the value and provide a score reflecting the distance between the values after conversion to the same units. For example, the hypothesis generation module 206 may produce two passages with candidate answers. The first passage states "William Howard Taft was the heaviest president at 152 kilograms." The second passage states "Grover Cleveland weighed 280 pounds." In current systems, the first passage would not be identified as a passage with a candidate answer because a naive string-matching approach would not recognize 152 kilograms as a synonym for 335 pounds. However, using the disclosed embodiments, the hypothesis scoring module 208 is configured to treat all values/measurement units in the passages as synonyms of the value/measurement unit in the question, and score the synonym based on its proximity to the original, targeted value/measurement unit. For example, the hypothesis scoring module 208 would assign a higher confidence score to the first passage that includes that includes the measurement value "152 kilograms" than a confidence score of the second passage that includes the measurement value "280 pounds" because 152 kilograms is approximately equal to 335 pounds, whereas there is a 55 pound difference between the measurement value found in the second passage and the measurement value in the question. The merging and ranking module 210 may utilize the measurement value confidence score along with other scoring factors to determine an answer 212 to the question 202.

As in the above example, the measurement value confidence score of a passage value may be based on its proximity to the original value in the question. In one embodiment, the score may be defined by a decay function. One example of a decay function that may be implemented in accordance with a disclosed embodiment is:

$$score=1/(z^{(|x-y*c|)})$$

where x is the number of units in the question, y is the number of alternative units in the passage, c is the conversion rate from y units to x-units, and z is a scaling factor that is greater than 1.

As an example, let's apply the decay function to the above example question of "Which President of the United States was 335 pounds?" and the passage "William Howard Taft was the heaviest president at 152 kilograms" using a scaling factor of 2. The conversion rate (c) from kilogram to pounds is 2.20462, x is 335, and y is 152. Thus, the score equals $1/(2^{(|335-152*2.20462|)})=1/(2^{(|-0.10224|)})=1/(2^{0.10244})=1/1.07=0.935$. This means that measurement value in the passage matches the measurement value with a confidence score of 0.935 as opposed to failing to match entirely in current systems.

Similarly, using the synonym measurement module 214, the disclosed embodiments are able to provide an answer in the measurement unit specified in a question or a default measurement unit that is different from the measurement unit found in a passage. For example, if a user in the United States ask "Who is the heaviest person alive?" and a passage states that the heaviest person alive is 635 kilograms, the QA system 130 may automatically convert the measurement value found in the passage to 1400 pounds as it is generally the default measurement unit for describing a person's weight in the United States. Similar conversion may apply to other locations.

In an embodiment, the QA system 130 may also be configured to process questions that include a value preposition associated with a measurement value such as "less than", "at least", "more than", "at most", "equal to", etc. For example, the question may be "Which President served less than 1 term?" In this case, the following sentence "William Henry Harrison was president for 1 month" is preferable to a sentence that states "George H. W. Bush served only 1 term as president" in providing an answer to the question. To adjust for these prepositions, in certain embodiments, the scaling factor z may be split into two scaling factors: one for values that are less than the target value, and another for values that are more than the target value. In the case of "more than" and other meta-modifiers, the scaling factor would be closer to 1 for values that are more than the target value and be farther away from 1 for values that less than the target value, which would result in a higher confidence score for values that are more than the target value. In the case of "less than", the magnitude of the scaling factors would be reversed. For more neutral meta-modifiers like "about" or "nearly", the magnitude of the scaling factors may remain unchanged.

Figure 3:
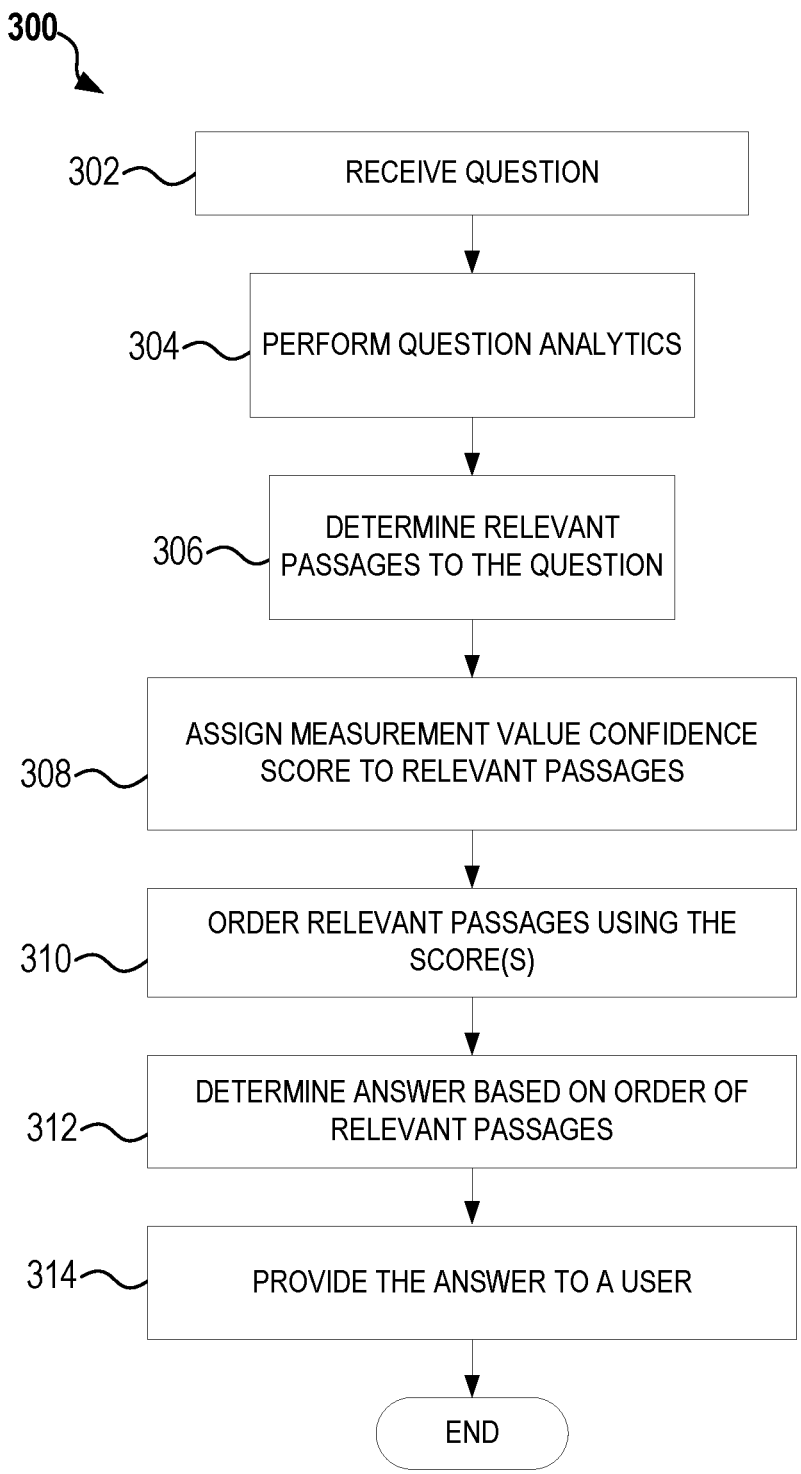
FIG. 3 is a flowchart of a computer-implemented method for determining an answer to a question that includes a measurement value according to an embodiment of the present disclosure.
Figure 4:
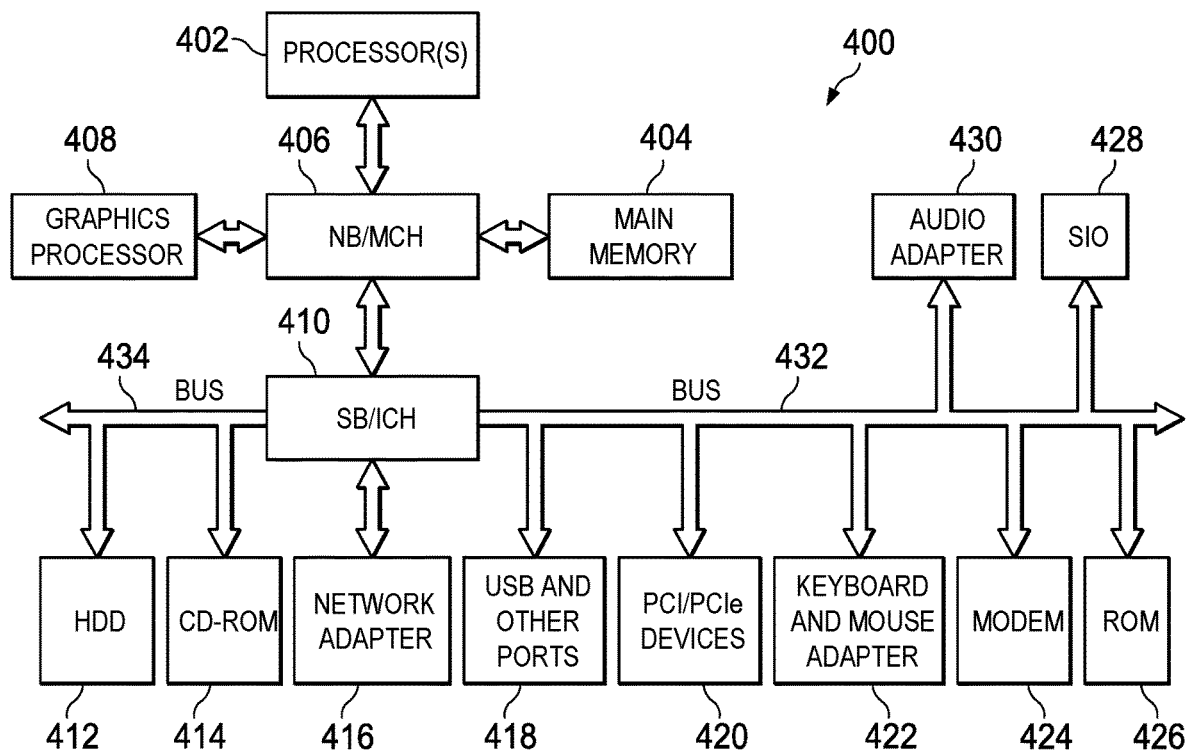
FIG. 4 is a block diagram illustrating a high-level hardware architecture of a QA system according to an embodiment of the present disclosure.

FIG. 3 is a flowchart of a computer-implemented method 300 for determining an answer to a question that includes a measurement value according to an embodiment of the present disclosure. In an embodiment, the computer-implemented method 300 may be implemented in the modules described in FIG. 2 using any form of computer executable instructions and executed by a processor as shown in FIG. 4. The computer-implemented method 300 begins at step 302 by receiving a question. At step 304, the computer-implemented method 300 performs question analytics on the question as described above to determine its meaning. In accordance with an embodiment, the question analytics includes identifying measurement values and measurement units in the question.

At step 306, the computer-implemented method 300 determines relevant passages to the question by querying one or more knowledge sources as described above. At step 308, the computer-implemented method 300 assigns a measurement value confidence score to the relevant passages based on a proximity of the measurement values found in the passages to the measurement value in the question. This process may involve converting the measurement value(s) in the question from a first measurement unit to a second measurement unit such as a default measurement unit or a measurement unit found in a passage. Alternatively, in some embodiments, the computer-implemented method 300 may convert the measurement value(s) in the one or more passages to the measurement unit found in the question for performing the comparison, as opposed to converting the measurement value(s) found in the question.

At step 310, the computer-implemented method 300 determines an order of the relevant passages using the score(s) of each of the relevant passages. In one embodiment, the order of the relevant passages may take into account the scores generated by other scoring algorithms as they pertain to the relevant passages such as confidence scores for key term matching.

At step 312, the computer-implemented method 300 determines an answer to the question based on the order of the relevant passages. Additionally, the computer-implemented method 300 may be configured to provide a confidence estimate that the answer is correct (e.g., 99% answer is correct).

At step 314, the computer-implemented method 300 provides the answer to a user, with the computer-implemented method 300 terminating thereafter. A user as referenced herein may be a person or other entity, such as a computer system, display device, or any device that requests or initiates the computer-implemented method 300.

FIG. 4 is a block diagram of an example data processing system 400 in which aspects of the illustrative embodiments may be implemented. For example, in one embodiment, QA system 130 may be implemented using data processing system 400. Although data processing system 400 depicts the basic components of a computing system, the disclosed embodiments may also be implemented in very advance systems such as an IBM® power server or the IBM Watson® supercomputer, which employs a cluster of IBM power servers.

In the depicted example, the data processing system 400 employs a hub architecture including north bridge and memory controller hub (NB/MCH) 406 and south bridge and input/output (I/O) controller hub (SB/ICH) 410. Processor(s) 402, main memory 404, and graphics processor 408 are connected to NB/MCH 406. Graphics processor 408 may be connected to NB/MCH 406 through an accelerated graphics port (AGP). A computer bus, such as bus 432 or bus 434, may be implemented using any type of communication fabric or architecture that provides for a transfer of data between different components or devices attached to the fabric or architecture.

In the depicted example, network adapter 416 connects to SB/ICH 410. Audio adapter 430, keyboard and mouse adapter 422, modem 424, read-only memory (ROM) 426, hard disk drive (HDD) 412, compact disk read-only memory (CD-ROM) drive 414, universal serial bus (USB) ports and other communication ports 418, and peripheral component interconnect/peripheral component interconnect express (PCI/PCIe) devices 420 connect to SB/ICH 410 through bus 432 and bus 434. PCI/PCIe devices may include, for example, Ethernet adapters, add-in cards, and PC cards for notebook computers. PCI uses a card bus controller, while PCIe does not. ROM 426 may be, for example, a flash basic input/output system (BIOS). Modem 424 or network adapter 416 may be used to transmit and receive data over a network.

HDD 412 and CD-ROM drive 414 connect to SB/ICH 410 through bus 434. HDD 412 and CD-ROM drive 414 may use, for example, an integrated drive electronics (IDE) or serial advanced technology attachment (SATA) interface. In some embodiments, HDD 412 may be replaced by other forms of data storage devices including, but not limited to, solid-state drives (SSDs).

A super I/O (SIO) device 428 may be connected to SB/ICH 410. SIO device 428 may be a chip on the motherboard that is configured to assist in performing less demanding controller functions for the SB/ICH 410 such as controlling a printer port, controlling a fan, and/or controlling the small light emitting diodes (LEDS) of the data processing system 400.

The data processing system 400 may include a single processor 402 or may include a plurality of processors 402. Additionally, processor(s) 402 may have multiple cores. For example, in one embodiment, data processing system 400 may employ a large number of processors 402 that include hundreds or thousands of processor cores. In some embodiments, the processors 402 may be configured to perform a set of coordinated computations in parallel.

An operating system is executed on the data processing system 400 using the processor(s) 402. The operating system coordinates and provides control of various components within the data processing system 400 in FIG. 4. Non-limiting examples of operating systems include the Advanced Interactive Executive (AIX®) operating system or the Linux® operating system. Various applications and services may run in conjunction with the operating system. For example, in one embodiment, International Business Machines (IBM)® DeepQA software, which is designed for information retrieval that incorporates natural language processing and machine learning, may be executed on the data processing system 400.

Instructions for the operating system, applications, and other data are located on storage devices, such as one or more HDD 412, and may be loaded into main memory 404 for execution by processor(s) 402. In some embodiments, additional instructions or data may be stored on one or more external devices. The processes described herein for the illustrative embodiments may be performed by processor(s) 402 using computer usable program code, which may be located in a memory such as, for example, main memory 404, ROM 426, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method performed by at least one server for determining an answer to a question that includes a measurement value, the computer-implemented method comprising:

receiving, via a network adapter, a question over a communication link from a client device;

analyzing the question to identify syntactic and semantic elements of the question, and a first measurement value in the question, wherein the first measurement value comprises a first value and a first measurement unit associated with the first value;

generating queries based on the syntactic and semantic elements, and the first measurement value corresponding to the question;

communicating, via the network adapter, with a knowledge base;

executing the generated queries on data contained in the knowledge base to identify passages in the knowledge base that contain candidate answers for providing an answer to the question;

determining a measurement value confidence score for each of the identified passages based on a proximity of the first measurement value in the question and a second measurement value comprising a second value and a second measurement unit identified in each of the identified passages, wherein determining the measurement value confidence score comprises converting at least one of the first value or the second value when the first measurement unit is different from the second measurement unit, and wherein the measurement value confidence score is determined using a decay function, and wherein the decay function is $1/(z^{\wedge}(|x-y*c|))$, where x is a number of x-units in the question, y is a number of y-units in a passage, c is a conversion rate from the y-units to the x-units, and z is a scaling factor that is greater than one;

executing a plurality of scoring algorithms that utilizes a plurality of factors to determine a passage score for each of the identified passages, wherein the plurality of factors comprises a degree of match between a predicate-argument structure of each of the identified passages and the question, a passage source reliability, and the measurement value confidence score for each of the identified passages;

determining a passage confidence score by weighing the passage score for each of the identified passages against a statistical model;

determining an order of the passages based on the passage confidence score of each of the identified passages; and determining the answer to the question from the candidate answers based on the order of the identified passages; and transmitting, via the network adapter, the answer over the communication link to the client device.

2. The computer-implemented method of claim 1, wherein the scaling factor is modified based on a value preposition associated with the measurement value specified in the question.

3. The computer-implemented method of claim 2, wherein the scaling factor is split into two scaling factors based on the value preposition associated with the first measurement value specified in the question.

4. The computer-implemented method of claim 1, wherein converting at least one of the first value or the second value when the first measurement unit is different from the second measurement unit comprises converting the second measurement value to the first measurement unit corresponding to the first measurement value of the question.

5. The computer-implemented method of claim 1, wherein converting at least one of the first value or the second value when the first measurement unit is different from the second measurement unit comprises converting both the first measurement value and the second measurement value to a default measurement unit.

6. The computer-implemented method of claim 5, wherein the default measurement unit is determined based on a location of the client device.

7. The computer-implemented method of claim 1, wherein the computer-implemented method is performed by a cluster of servers.

8. A server configured to determine an answer to a question that includes a measurement value, the server comprising, a network adapter, memory for storing instructions, and a processor configured to execute the instructions to:
receive, via the network adapter, a question over a communication link from a client device;
analyze the question to identify syntactic and semantic elements of the question, and a first measurement value in the question, wherein the first measurement value comprises a first value and a first measurement unit associated with the first value;
generate queries based on the syntactic and semantic elements, and the first measurement value corresponding to the question;
communicate, via the network adapter, with a knowledge base;
execute the generated queries on data contained in the knowledge base to identify passages in the knowledge base that contain candidate answers for providing an answer to the question;
determine a measurement value confidence score for each of the identified passages based on a proximity of the first measurement value in the question and a second measurement value comprising a second value and a second measurement unit identified in each of the identified passages, wherein determining the measurement value confidence score comprises converting at least one of the first value or the second value when the first measurement unit is different from the second measurement unit, and wherein the measurement value confidence score is determined using a decay function, and wherein the decay function is $1/(z^{(|x-y*c|)})$, where x is a number of x-units in the question, y is a number of y-units in a passage, c is a conversion rate from the y-units to the x-units, and z is a scaling factor that is greater than one;
execute a plurality of scoring algorithms that utilizes a plurality of factors to determine a passage score for each of the identified passages, wherein the plurality of factors comprises a degree of match between a predicate-argument structure of each of the identified passages and the question, a passage source reliability, and the measurement value confidence score;
determine a passage confidence score by weighing the passage score for each of the identified passages against a statistical model;
determine an order of the passages based on the passage confidence score of each of the identified passages;
determine the answer to the question from the candidate answers based on the order of the identified passages; and
transmit, via the network adapter, the answer over the communication link to the client device.

9. The server of claim 8, wherein the scaling factor is split into two scaling factors based on a value preposition associated with the first measurement value specified in the question.

10. The server of claim 8, wherein converting at least one of the first value or the second value when the first measurement unit is different from the second measurement unit comprises converting the second measurement value to the first measurement unit corresponding to the first measurement value of the question.

11. The server of claim 8, wherein converting at least one of the first value or the second value when the first measurement unit is different from the second measurement unit comprises converting both the first measurement value and the second measurement value to a default measurement unit.

12. The server of claim 11, wherein the default measurement unit is determined based on a location of the client device.

13. A computer program product for determining an answer to a question that includes a measurement value, the computer program product comprising a computer readable storage medium having program instructions embodied therewith, the program instructions executable by a processor of a server to cause the server to:
receive, via a network adapter, a question over a communication link from a client device;
analyze the question to identify syntactic and semantic elements of the question, and a first measurement value in the question, wherein the first measurement value comprises a first value and a first measurement unit associated with the first value;
generate queries based on the syntactic and semantic elements, and the first measurement value corresponding to the question;
communicate, via the network adapter, with a knowledge base;
execute the generated queries on data contained in the knowledge base to identify passages in the knowledge base that contain candidate answers for providing an answer to the question;
determine a measurement value confidence score for each of the identified passages based on a proximity of the first measurement value in the question and a second measurement value comprising a second value and a second measurement unit identified in each of the identified passages, wherein determining the measurement value confidence score comprises converting at least one of the first value or the second value when the first measurement unit is different from the second measurement unit, and wherein the measurement value confidence score is determined using a decay function, and wherein the decay function is $1/(z^{(|x-y*c|)})$, where x is a number of x-units in the question, y is a number of y-units in a passage, c is a conversion rate from the y-units to the x-units, and z is a scaling factor that is greater than one;
execute a plurality of scoring algorithms that utilizes a plurality of factors to determine a passage score for each of the identified passages, wherein the plurality of factors comprises a degree of match between a predicate-argument structure of each of the identified passages and the question, a passage source reliability, and the measurement value confidence;
determine a passage confidence score by weighing the passage score for each of the identified passages against a statistical model;
determine an order of the passages based on the passage confidence score of each of the identified passages;
determine the answer to the question from the candidate answers based on the order of the identified passages; and
transmit, via the network adapter, the answer over the communication link to the client device.

14. The computer program product of claim 13, wherein the program instructions executable by the processor further includes instructions to convert the second measurement value to a default measurement unit.

15. The computer program product of claim 14, wherein the default measurement unit is determined based on a location of the client device.

16. The computer program product of claim 13, wherein executing the plurality of scoring algorithms that utilizes the plurality of factors to determine the passage score for each of the identified passages comprises obtaining additional supporting evidence for each of the candidate answers and evaluating each of the candidate answers in a context of the supporting evidence.

17. The computer program product of claim 13, wherein the scaling factor is split into two scaling factors based on a value preposition associated with the first measurement value specified in the question.

* * * * *